US012778025B2

(12) United States Patent
Geesey

(10) Patent No.: US 12,778,025 B2
(45) Date of Patent: Nov. 3, 2026

(54) ADJUSTABLE SLEDGE FOR ROUND BALER

(71) Applicant: CNH Industrial America LLC, New Holland, PA (US)

(72) Inventor: Daniel Geesey, Bethel, PA (US)

(73) Assignee: CNH Industrial America LLC, New Holland, PA (US)

( * ) Notice: Subject to any disclaimer, the term of this patent is extended or adjusted under 35 U.S.C. 154(b) by 332 days.

(21) Appl. No.: 18/582,788

(22) Filed: Feb. 21, 2024

(65) Prior Publication Data

US 2025/0261592 A1 Aug. 21, 2025

(51) Int. Cl.
*A01F 15/08* (2006.01)

(52) U.S. Cl.
CPC ................................ *A01F 15/0833* (2013.01)

(58) Field of Classification Search
CPC ................ A01F 15/07; A01F 2015/077; A01F 2015/078; A01F 2015/079; A01F 2015/0795; A01F 15/0833
See application file for complete search history.

(56) References Cited

U.S. PATENT DOCUMENTS 4,765,237 A * 8/1988 Vansteelant ............. A01F 15/07 56/341
4,765,238 A 8/1988 De et al.
4,870,812 A 10/1989 Jennings et al.
5,138,942 A * 8/1992 Henderson .............. A01F 15/07 100/88
5,226,359 A 7/1993 Rempe
6,094,900 A 8/2000 Underhill et al.
6,145,292 A * 11/2000 Underhill ................ A01F 15/07 56/341
6,655,121 B1 12/2003 Viesselmann et al.
6,874,412 B1 4/2005 Glaszcz et al.
7,437,866 B2 10/2008 Smith et al.
2012/0042792 A1* 2/2012 Smith ................. A01F 15/0833 100/2

OTHER PUBLICATIONS

The Extended European Search Report issued Jul. 28, 2025, by the European Patent Office in corresponding European Patent Application No. 25159287.9. (6 pages).

* cited by examiner

*Primary Examiner* — Brad Harcourt
(74) *Attorney, Agent, or Firm* — Buchanan Ingersoll & Rooney PC

(57) ABSTRACT

A rotary baler includes a frame defining an expandable bale-forming chamber. A sledge assembly forms at least part of the expandable bale-forming chamber. The sledge assembly includes an arm and one or more rollers that are mounted to the arm. The one or more rollers are configured to assist in forming a bale within the chamber. The arm is pivotable relative to the frame about a pivot axis. The arm is also translatable in the fore to aft direction of the rotary baler relative to the frame, which changes a position of the pivot axis in the fore to aft direction.

14 Claims, 6 Drawing Sheets

ADJUSTABLE SLEDGE FOR ROUND BALER

FIELD OF THE INVENTION

The present invention relates to a round (rotary) baler, which is used for agricultural purposes.

BACKGROUND OF THE INVENTION

As is described in U.S. Pat. No. 7,437,866 (the '866 patent), which is incorporated by reference herein in its entirety, round (rotary) balers typically include an expandable bale-forming chamber. Bale-forming means, commonly referred to as a sledge, is/are positioned in the bale-forming chamber to assist in forming the bale within the chamber. The sledge includes a set of rollers, which may also be referred to herein as rolls. The rollers of the sledge are typically arranged in an arc formation, whereby the arc has a fixed diameter.

The entire sledge typically pivots about a single fixed pivot point (such as the pivot point at reference character 26 in FIG. 1). Due to the geometric constraints of such a sledge, the sledge can only have one rotational position where the arc formation of the sledge rollers (e.g., rollers 21-23 in FIG. 1) matches the arc formation of the other rollers (e.g., rollers 30 and 18 in FIG. 1) of the baler. This can result in an air gap or pocket formed between the sledge rollers and the perimeter of the bale that is being formed in the bale-forming chamber. Such a gap is shown in FIG. 2 at roller 23. The gap can result in an area where material can accumulate and without being pressed into the bale. This issue may be more pronounced for smaller diameter bales that are formed in balers designed for larger bales. It would be desirable to reconfigure the fixed pivot point of the sledge so that it is adjustable so as to avoid the aforementioned disadvantages of the above described conventional balers.

SUMMARY OF THE INVENTION

According to one example, a rotary baler includes a frame defining an expandable bale-forming chamber. A sledge assembly forms at least part of the expandable bale-forming chamber. The sledge assembly includes an arm and one or more rollers that are mounted to the arm. The one or more rollers are configured to assist in forming a bale within the chamber. The arm is pivotable relative to the frame about a pivot axis. The arm is also translatable in the fore to aft direction of the rotary baler relative to the frame, which changes a position of the pivot axis in the fore to aft direction.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "longitudinal", "transverse", "forward" (or fore), "rearward" (or aft), "left" and "right" used in connection with the bale and/or components thereof are determined with reference to the direction of forward operative travel of the baler and should not be considered as limiting. Also, the terms "upper" and "lower" are used principally throughout this specification for convenience and it should be understood that these terms equally are not intended to be limiting.

Figure 1:
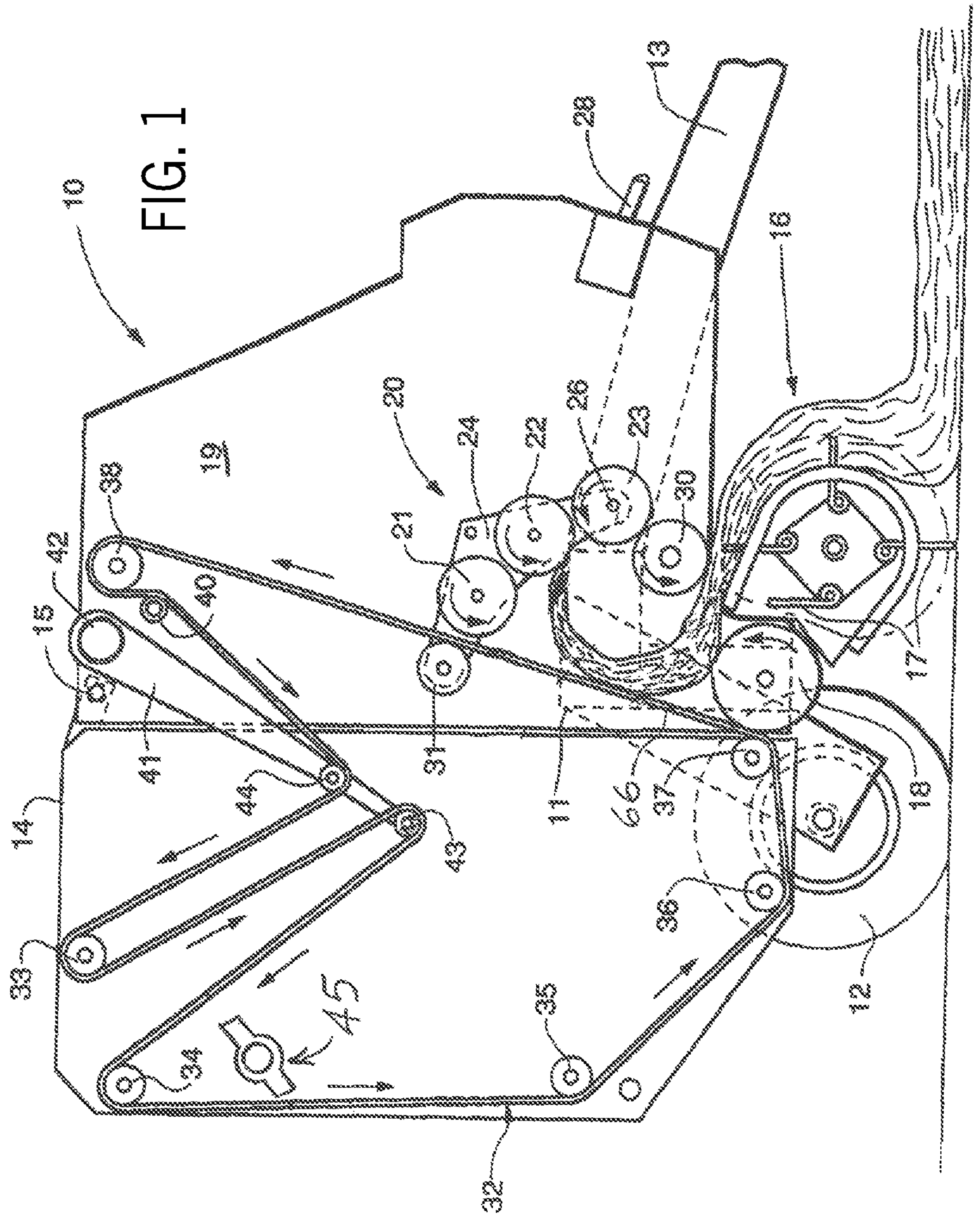
FIG. 1 is a side elevational view of a round baler.
Figure 2:
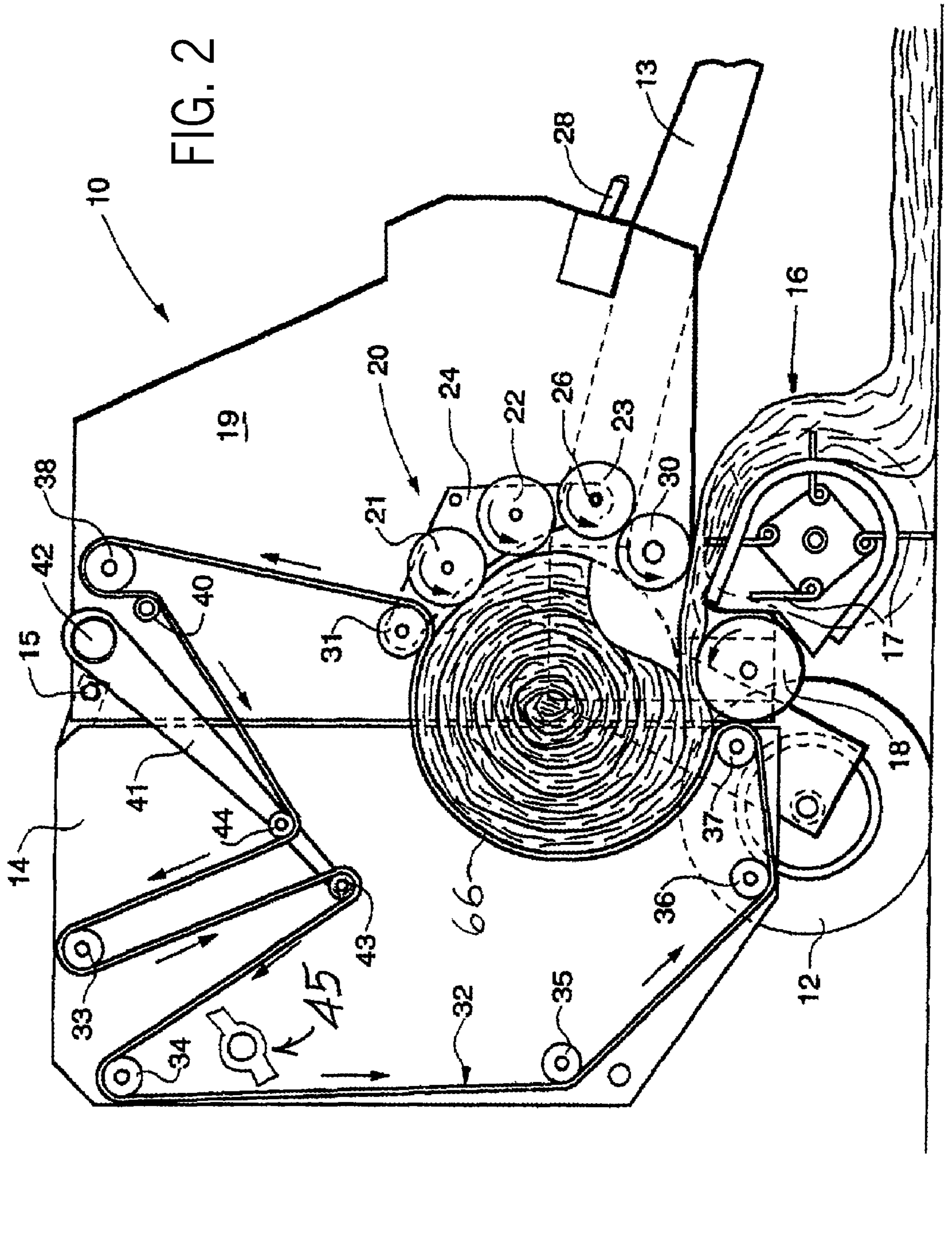
FIG. 2 is similar to FIG. 1 with the bale-forming chamber of the baler in its partly full position.
Figure 3:
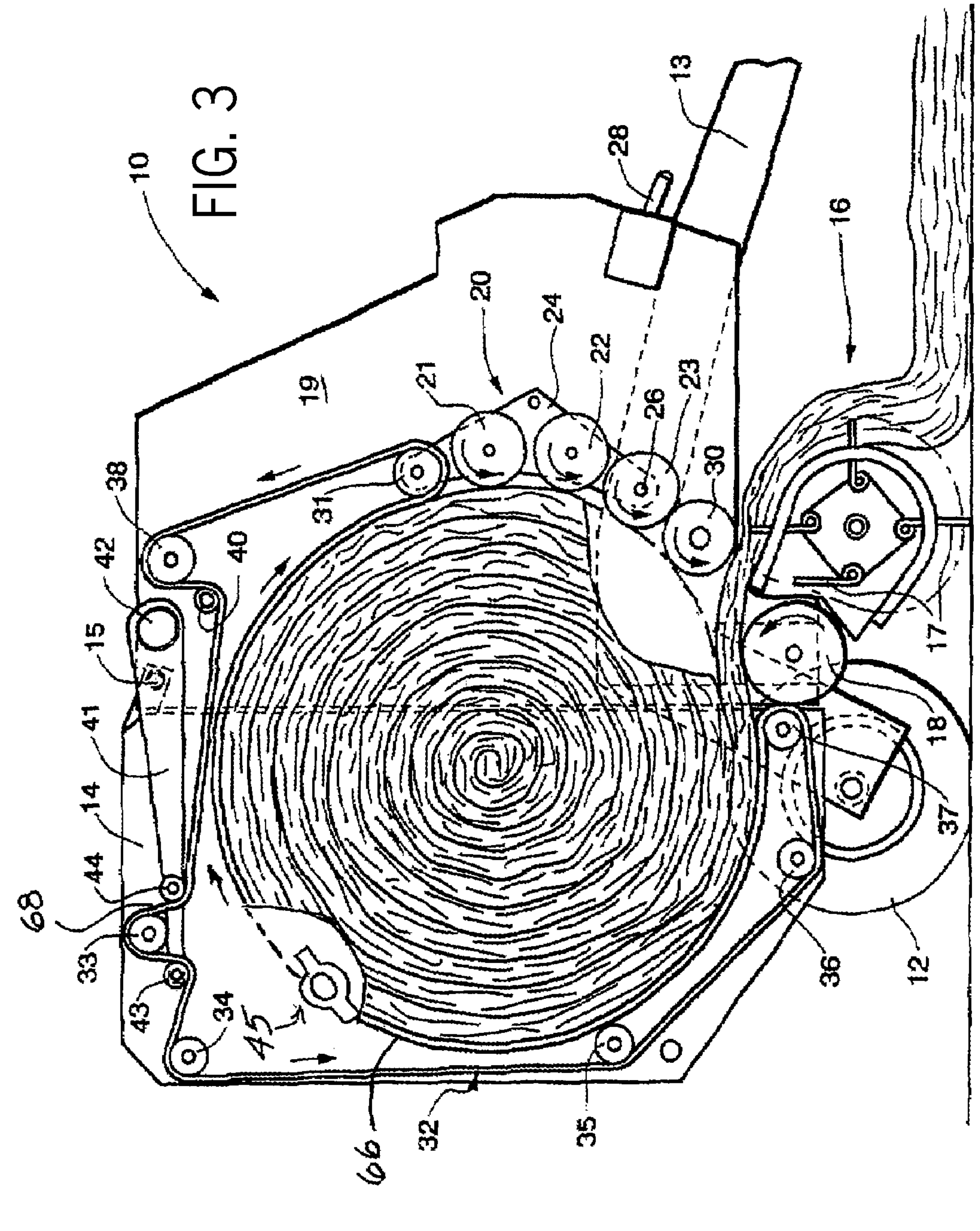
FIG. 3 is similar to FIG. 1 with the bale-forming chamber of the baler in its full bale position.
Figure 4:
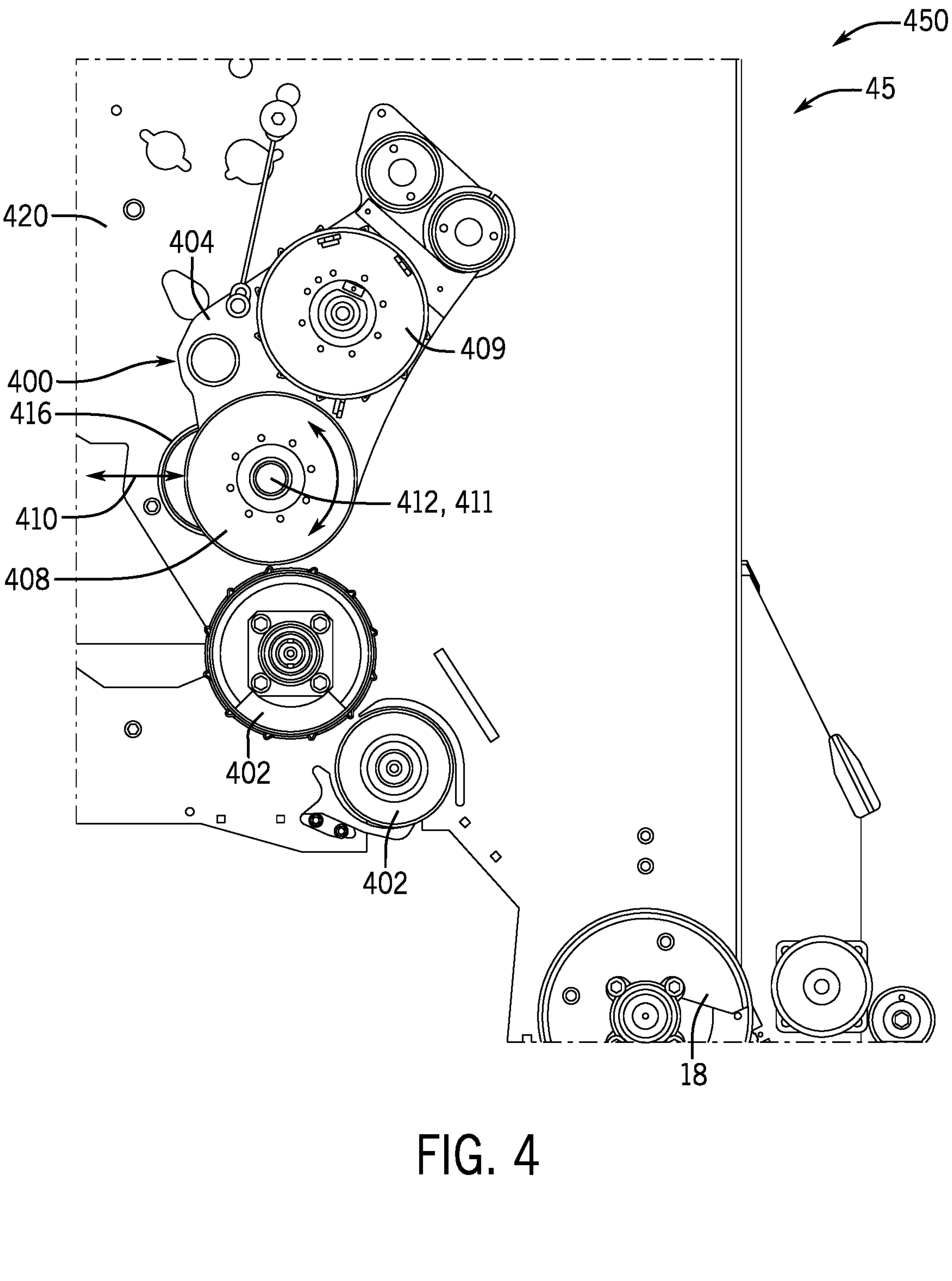
FIG. 4 is a schematic view of an alternative movable sledge for the baler of FIGS. 1-3, wherein the sledge is shown in an initial position.
Figure 5:
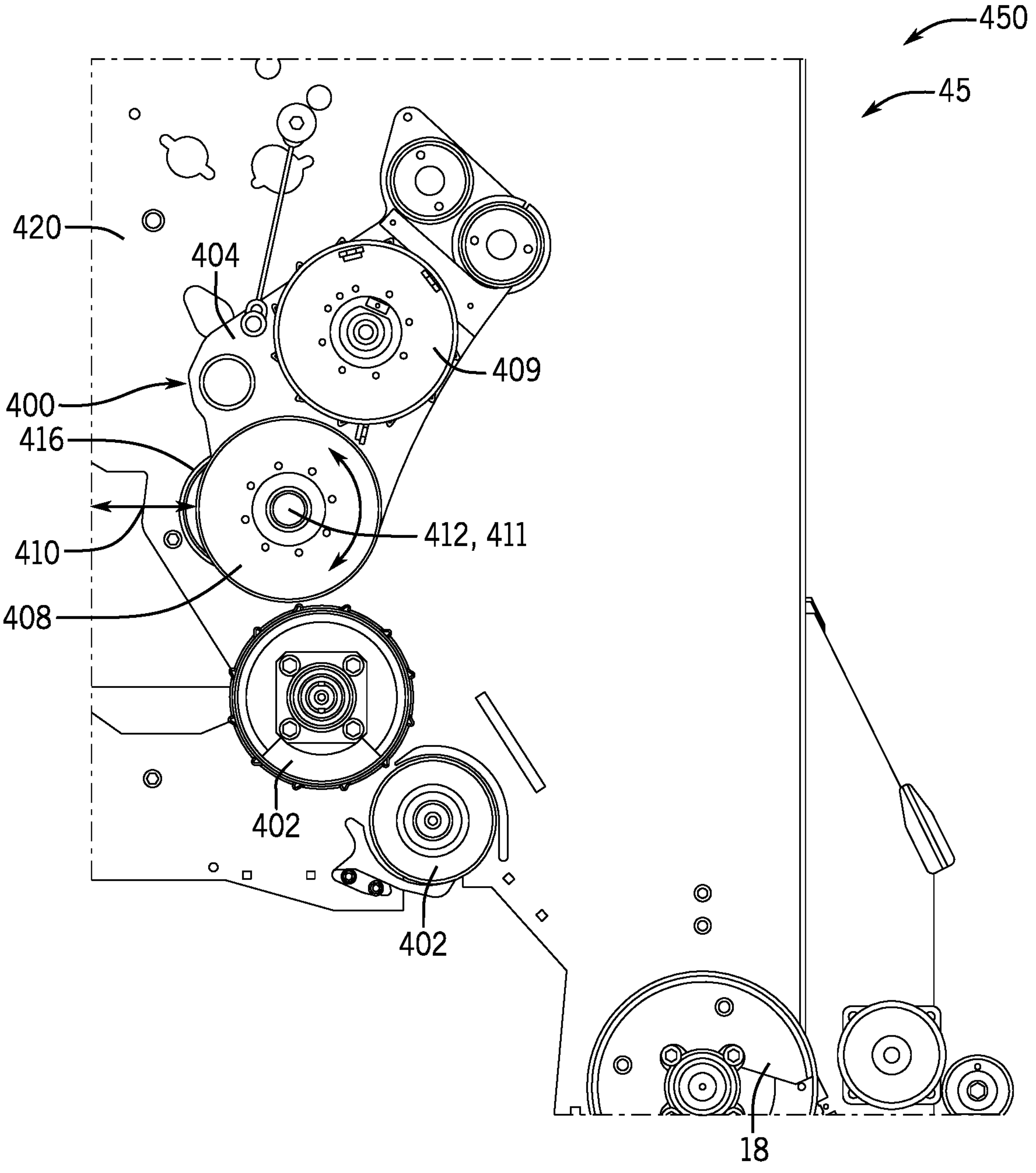
FIG. 5 is a view similar to that of FIG. 4, but showing said movable sledge in an extended position.

FIGS. 1-3 show a rotary or round baler 10 having an expandable chamber defined in part by belts and rollers. It should be understood at the outset that the details, features and functions of baler 10 described hereinafter can vary greatly. The details of baler 10 are provided hereinafter as background because they relate to the segment of the baler that is shown in FIGS. 4 and 5.

As is described in the '866 patent, baler 10 has a main frame 11, including a pair of side walls 19 (only side wall 19 shown), supported by a pair of wheels 12 (only one wheel 12 shown). As used herein, a rotary or round baler 10 is a baler that produces a substantially cylindrical bale having a substantially round or circular cross section. A forwardly mounted tongue 13 is provided on main frame 11 for connection to a tractor (not shown). Pivotally connected to a side wall 19 by a pair of stub shafts 15 is a tailgate 14 which is closed during bale formation. A pickup 16, mounted on main frame 11, includes tines 17 movable in a predetermined path to lift crop material from the ground and deliver it to a floor roller 18, rotatably mounted on main frame 11.

A sledge assembly 20 for forming the bales is disposed at the perimeter of the bale forming chamber. The sledge assembly 20 comprises transversely extending rollers 21, 22, 23 journaled at their ends in a pair of spaced arms 24, one of which is shown. These arms 24 are pivotally mounted on stub shafts 26 for providing rotational movement of sledge assembly 20 from the bale starting position shown in FIG. 1 through the partly full position shown in FIG. 2 to the full bale position shown in FIG. 3. Simply stated, arm 24 rotates about shaft 26. Stub shafts 26 are stationary, the relevance of which will be described in greater detail with reference to FIGS. 4-7. Rollers 21, 22, 23 are driven in a counter-clockwise direction by conventional means coupled to a drive shaft 28. A starter roller 30, mounted on main frame 11, is also driven counter-clockwise. A freely rotatable idler roller 31, carried by arms 24, moves in an arcuate path with sledge assembly 20.

The bale-forming chamber is further defined by an apron 32 comprising a plurality of continuous side-by-side belts supported by guide rollers 33, 34, 35, 36, 37 rotatably mounted in tailgate 14. Apron 32 is also supported by drive roller 38, mounted on main frame 11. Although apron 32 passes between roller 21 and idler roller 31, it is in engagement only with idler roller 31 and not roller 21. Suitable coupling means (not shown) connected to drive shaft 28 provide rotation of drive roller 38 causing movement of apron 32 in the directions indicated by the arrows in FIGS. 1, 2 and 3. An additional guide roller 40 in the main frame 11 ensures proper engagement between apron 32 and drive roller 38. A pair of take up arms 41 (only one shown) is pivotally mounted on main frame 11 by a cross shaft 42 for movement between inner, intermediate and outer positions shown in FIGS. 1, 2 and 3, respectively. Take up arms 41, which carry additional guide rollers 43, 44 for supporting apron 32, are resiliently urged toward their inner positions (FIG. 1).

When the elements of round baler 10 are disposed as shown in FIG. 1, an inner course 66 of apron 32 extends between guide roller 37 and idler roller 31 to form the rear wall of the core starting chamber, while the inwardly facing surfaces of rollers 21, 22, 23 define in a general manner, a rearwardly inclined front wall. Floor roller 18 defines the bottom of the chamber, and with starter roller 30, provides an inlet for crop material.

Turning now to operation of baler 10, when round baler 10 travels across a field, pickup tines 17 lift crop material from the ground and deliver it through the inlet. The crop material is conveyed by floor roller 18 into engagement with apron inner course 66 (FIG. 1) which urges the crop material upwardly and forwardly into engagement with the rollers on sledge assembly 20. In this manner, crop material is coiled in a clockwise direction to start a bale core. Continued feeding of crop material into the chamber by pickup tines 17 causes apron inner course 66 to expand in length around a portion of the circumference of the bale core as the diameter increases (FIG. 2). Take up arms 41 rotate from their inner position, shown in FIG. 1, toward their outer position, shown in FIG. 3, to accommodate expansion of the inner course 66 of the apron in a well-known manner, i.e., an outer course 68 of apron 32 is diminished in length while the inner course 66 increases a like amount. After a bale has been formed and wrapped, tailgate 14 is opened and the bale is ejected rearwardly. Subsequent closing of tailgate 14 returns the inner and outer courses 66, 68 of apron 32 to the locations shown in FIG. 1.

A sensor 45 continuously monitors the outer surface of a bale being formed, and communicates the same to a controller of the baler 10. Sensor 45 may be, for example, an optical sensor, a contact sensor having a wiper, a force sensor, a potentiometer, or any other sensor that is known in the art for either directly or indirectly sensing the bale diameter. Sensor 45 communicates its measurement to a controller of the baler, and the controller (in the form of a computer having a processor, receiver, transmitter, memory, etc.) is configured to interpret the sensed bale diameter.

During bale formation, sledge assembly 20 rotates about stub shaft 26 (one shown) between a bale starting position (FIG. 1) to a full bale position (FIG. 3). This movement causes idler roller 31 to move along an arcuate path while maintaining apron 32 in close proximity to roller 21, thereby allowing roller 21 to strip crop material from the belts. Sledge assembly 20 is rotated outwardly about shaft 26 towards its full bale position during bale formation as the crop material expands against rollers 21, 22, 23 and then subsequently is rotated inwardly about shaft 26 by apron 32 to the position shown in FIG. 1.

As noted above, due to the geometric constraints of sledge 20, the sledge can only have one position where the arc formation of the sledge rollers aligns with the arc formation of the other rollers 18 and 30 that are not directly attached to the sledge 20. This can result in a gap or pocket forming between the sledge rolls and the perimeter of the bale being formed in the bale-forming chamber. Such a gap is shown in FIG. 2 at roller 23. The gap can result in an area where material can accumulate without being pressed into the bale. This problem may be more pronounced for smaller diameter bales if the baler is designed for larger bales. As noted above, it would be desirable to reconfigure the fixed pivot point of the sledge 20 so that it is adjustable so to avoid the aforementioned disadvantages. Such a reconfigured sledge is shown in FIGS. 4 and 5.

Turning now to FIGS. 4 and 5, depicted is an alternative sledge assembly 400 for the round baler 10. Sledge assembly 400 is analogous to sledge assembly 20. It should be understood that all of the other details provided above with respect to the baler of FIGS. 1-3 are (or may be) applicable to the baler shown in FIGS. 4 and 5. It should also be understood that in the example of FIGS. 4 and 5, an opposing side of baler is depicted such that the component locations are reversed (i.e., mirror images). Lastly, it should also be understood that while the number and arrangement of rollers on the balers shown in FIGS. 1 and 4 differ, such differences have no effect on the spirit of the invention. For example, sledge assembly 400 has only two large rollers 408 and 409 wherein the sledge assembly 20 includes four rollers.

Sledge assembly 400 generally includes an arm 404 (analogous to arm 24). One or more rollers 408 and 409 are connected to arm 404. Roller 408 is analogous to roller 23. Roller 408 is mounted on a movable stub shaft 411. Stub shaft 411 is analogous to stub shaft 26, with the exception that stub shaft 411 is translatable (or otherwise moveable) as will be described with reference to FIGS. 6 and 7.

The entire sledge assembly 400 is pivotable about the stub shaft 411 (see rotational arrows in FIG. 4). Axis 412 represents both the pivot axis of the sledge assembly 400 and the rotational axis 412 of roller 408. It should be understood that roller 408 is capable of rotation about axis 412 irrespective of the pivoting action of sledge assembly 400 about axis 412. While the sledge assembly 400 is only shown in one rotational position in FIGS. 4 and 5, it should be understood that assembly 400 is capable of the rotational range of the sledge that is shown in FIGS. 1-3. One or more stationary rollers 402 are positioned beneath sledge assembly 400, and all of the rollers 402, 408, 409, etc. together form an arc.

Furthermore, unlike the sledge assembly 20 of FIG. 1, the sledge assembly 400 is translatable in the forward/rearward (i.e., fore to aft) directions along axis 410. FIG. 5 depicts the sledge assembly 400 in an extended position (i.e., extended along axis 410), whereas FIG. 4 depicts the sledge assembly 400 in initial or starting position along axis 410. Although not shown, sledge assembly 400 may be reconfigured so that the axis 412 is adjustable in various other directions, and is not limited to translating along axis 410.

Figure 6:
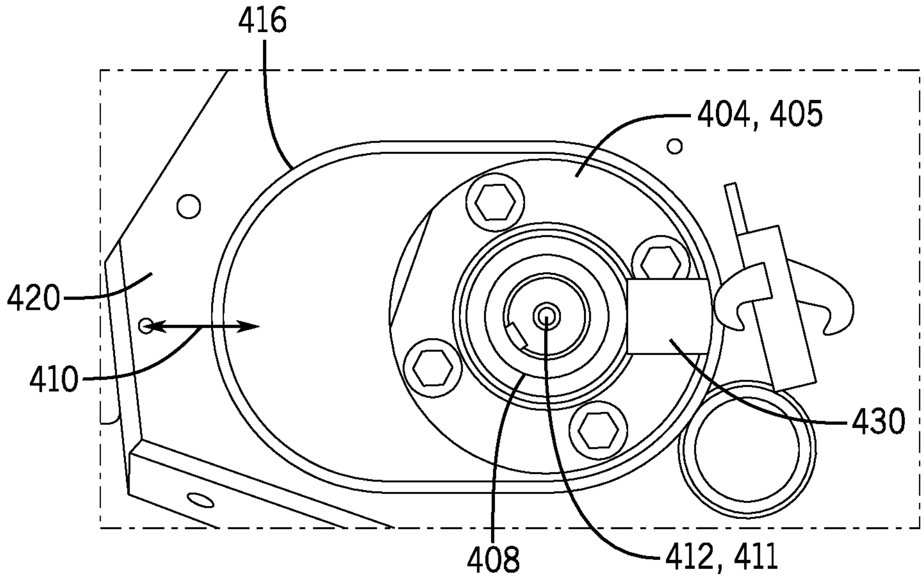
FIG. 6 is a detailed view of the baler of FIGS. 4 and 5 showing an actuator for biasing the movable sledge, wherein the sledge is shown in the initial position corresponding to FIG. 4.
Figure 7:
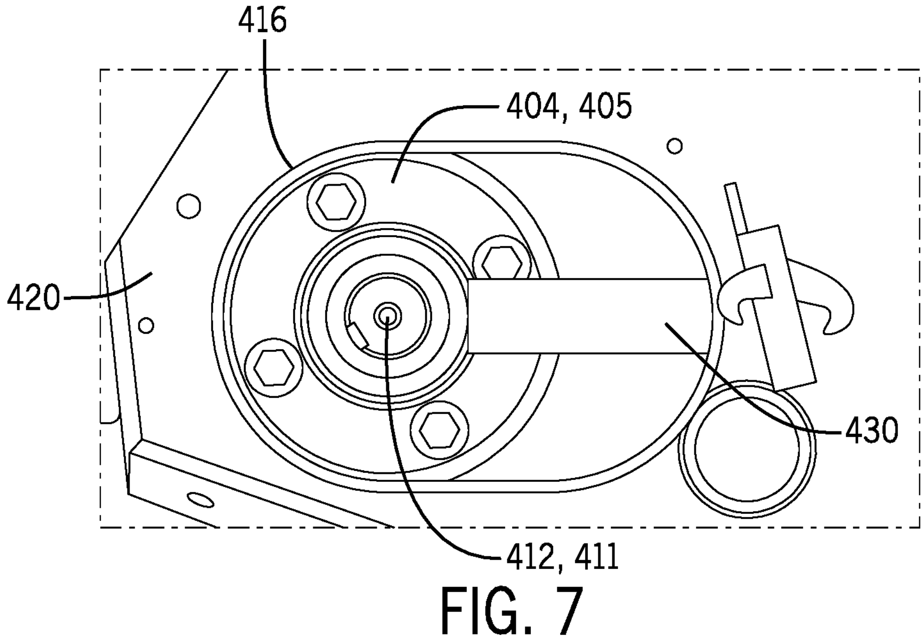
FIG. 7 is a view similar to FIG. 6 with the sledge shown in the extended position corresponding to FIG. 5.

Turning now to FIGS. 6 and 7, stub shaft 411 is connected to a hub 405, and hub 405 may be positioned within an elongated slot or channel 416 that is formed in a wall 420 of the baler. Wall 420 may be analogous to wall 19. Hub 405 and its stub shaft 411 are capable of translating within channel 416 along axis 410 between the positions shown in FIGS. 6 and 7. These two positions may represent the limits of translation of sledge assembly 400.

An actuator 430 is connected to shaft 411 for translating shaft 411 (as well as the entire sledge assembly 400) along axis 410. Actuator may have a piston and cylinder arrangement, as shown, or actuator 430 may be a solenoid, for example. One end of actuator 430 is mounted to a stationary object, such as wall 420, while the moveable end of actuator 430 is either directly or indirectly mounted to shaft 411 such that extension or retraction of actuator 430 causes translation of shaft 411 along axis 410. The actuator 430 may be powered either hydraulically, electrically or pneumatically, for example. The actuator 430 may comprise an internal spring for biasing purposes. As an alternative to the piston and cylinder arrangement, the actuator 430 may be replaced by a mechanical linkage.

The baler of FIGS. 4 and 5 includes the above-described sensor 45 and a controller 450 (shown schematically in FIG. 4). Sensor 45 communicates its bale diameter measurement to controller 450, and the controller 450 is configured to (i) interpret the sensed bale diameter and (ii) control actuator 430 based upon that interpretation of the sensed bale diameter. Simply stated, controller 450 actuates actuator 430 to translate sledge assembly 400 along axis 410 based upon the bale diameter sensed, measured or otherwise interpreted by sensor 45. Stated another way, controller 450 is configured to control the position of the pivot point 412 of the sledge 400 based on the current bale diameter. As the bale grows in diameter, the sledge pivot axis 412 is adjusted by actuator 430 to better match the bale diameter. Actuator 430 is also configured to lock the position of the pivot axis 412 to prevent inadvertent movement of the pivot axis 412 during operation. A separate locking mechanism may be employed, if so desired.

It should be understood that moving the sledge rearward (i.e., toward the centerline of the bale) better accommodates smaller bale diameter and moving the sledge forward better matches a larger bale diameter. The position of the sledge is determined by the current bale size. As the bale diameter grows, the cylinder moves the pivot axis 412 of the sledge 400 along axis 410 from the starting point (see FIG. 4) for a smaller diameter bale to a final pivot point position (see FIG. 5) intended for a maximum bale diameter. The position of sledge 400 is driven as a function of the bale diameter, as monitored by sensor 45.

It should be understood that as the bale diameter grows, the translational position (i.e., along axis 410) of the sledge 400 shifts to accommodate the larger, growing bale. This constant pivot point adjustment allows the sledge roller arc to match the bale profile of the desired bale diameter and limits round bales from being formed in a non-circular bale chamber. Tying the sledge pivot point to the bale diameter allows the sledge arc formed by the rollers as well as the bale formation rollers position to match the bale profile based on the bale diameter.

As an alternative to the automated method for shifting the translational position of sledge 400, the sledge 400 shift outwardly under the pressure of the growing bale, and return to its initial position by way of spring (at the same location as actuator 430. Thus, item 430 could also represent a spring.

It is to be understood that the operational steps are performed by the controller 450 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 450 described herein is implemented in software code or instructions which are tangibly stored on a tangible computer readable medium. Upon loading and executing such software code or instructions by the controller 450, the controller 450 may perform any of the functionality of the controller 450 described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A rotary baler comprising:

a frame defining an expandable bale-forming chamber; and a sledge assembly disposed on and defining a boundary of the expandable bale-forming chamber, wherein the sledge assembly comprises an arm and one or more rollers that are mounted to the arm, wherein the one or more rollers are configured to assist in forming a bale within the chamber, wherein the arm is pivotable relative to the frame about a pivot axis, and wherein the sledge assembly is translatably positioned within an elongated slot that is formed in the frame such that the arm is also independently translatable relative to the frame for adjusting a position of the pivot axis.

2. The rotary baler of claim 1, wherein the one or more rollers that are directly mounted to the arm.

3. The rotary baler of claim 1, wherein the sledge assembly is configured to translate relative to the frame without rotating about the pivot axis.

4. The rotary baler of claim 1, further comprising a sensor for sensing a diameter of the bale being formed within the chamber.

5. The rotary baler of claim 4, further comprising an actuator for translating the sledge assembly relative to the frame.

6. The rotary baler of claim 5, further comprising a controller that receives signals from the sensor and is also configured to control the actuator, wherein the controller is configured to actuate the actuator as a function of the signals received from the sensor.

7. The rotary baler of claim 6, wherein the controller is configured to actuate the actuator to translate the sledge assembly so that the bale-forming chamber expands when the sensor senses an increase in bale diameter.

8. The rotary baler of claim 5, wherein the actuator comprises a piston and cylinder arrangement.

9. The rotary baler of claim 1, wherein the rotary baler comprises stationary rollers that are not attached to the arm.

10. The rotary baler of claim 9, wherein the stationary rollers and the one or more rollers of the sledge assembly are arranged along an arc.

11. A rotary baler comprising:

a frame defining an expandable bale-forming chamber; and a sledge assembly disposed on and defining a boundary of the expandable bale-forming chamber, wherein the sledge assembly comprises an arm and one or more rollers that are mounted to the arm, wherein the one or more rollers are configured to assist in forming a bale within the chamber, wherein the arm is pivotable relative to the frame about a pivot axis, wherein the arm is also independently translatable relative to the frame for adjusting a position of the pivot axis, and wherein one roller of said one or more rollers of the sledge assembly is rotatably mounted to a shaft, and the shaft also forms said pivot axis.

12. The rotary baler of claim 11, wherein said one roller is rotatable about the pivot axis, and an entirety of the sledge assembly is rotatable about said pivot axis independent of rotation of said one roller.

13. The rotary baler of claim 11, wherein the shaft is translatably positioned within an elongated slot that is formed in the frame.

14. The rotary baler of claim 13, wherein the shaft is mounted to a hub and the hub is translatably positioned within the elongated slot.

* * * * *